(12) United States Patent
Sahu et al.

(10) Patent No.: US 9,344,894 B2
(45) Date of Patent: May 17, 2016

(54) METHODS AND SYSTEMS FOR HANDLING MALICIOUS ATTACKS IN A WIRELESS COMMUNICATION SYSTEM

(71) Applicant: QUALCOMM Incorporated, San Diego, CA (US)

(72) Inventors: Debesh Kumar Sahu, Hyderabad (IN); Vishvadeep Gopalbhai Devnani, Hyderabad (IN); Bala Krishna Kotha, Hyderabad (IN); Ashish Bajaj, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 180 days.

(21) Appl. No.: 14/176,784

(22) Filed: Feb. 10, 2014

(65) Prior Publication Data

US 2015/0230091 A1 Aug. 13, 2015

(51) Int. Cl.
| | | |
|---|---|---|
| *H04M 1/66* | (2006.01) | |
| *H04W 12/08* | (2009.01) | |
| *H04L 12/26* | (2006.01) | |
| *H04L 29/06* | (2006.01) | |
| *H04W 12/12* | (2009.01) | |
| *G06F 11/00* | (2006.01) | |
| *H04W 12/10* | (2009.01) | |
| *H04L 29/12* | (2006.01) | |

(52) U.S. Cl.
CPC ............ *H04W 12/08* (2013.01); *H04L 43/18* (2013.01); *H04L 63/1441* (2013.01); *H04W 12/12* (2013.01); *H04L 61/2007* (2013.01); *H04W 12/10* (2013.01)

(58) Field of Classification Search
CPC ...................................................... H04M 1/66

USPC .......................................................... 455/410
See application file for complete search history.

(56) References Cited

U.S. PATENT DOCUMENTS

| | | | |
|---|---|---|---|
| 7,676,217 B2* | 3/2010 | Zhu ..................... | H04L 63/1408 455/410 |
| 7,854,001 B1* | 12/2010 | Chen ....................... | H04L 12/24 726/11 |
| 8,020,207 B2 | 9/2011 | Chow et al. | |
| 2004/0054925 A1 | 3/2004 | Etheridge et al. | |
| 2006/0229022 A1 | 10/2006 | Bu et al. | |

(Continued)

OTHER PUBLICATIONS

International Search Report and Written Opinion—PCT/US2015/014445—ISA/EPO—Apr. 22, 2015, (11 pages).

(Continued)

*Primary Examiner* — Huy C Ho
(74) *Attorney, Agent, or Firm* — Arent Fox LLP

(57) ABSTRACT

Certain aspects of the present disclosure relate to methods and apparatuses for handling malicious attacks. In one aspect, the methods and apparatuses are configured to identify packets received from a malicious source based at least in part on packets received by a wireless device that change a state of the wireless device from a dormant state to a connected state, selectively disconnect the wireless device from a packet data network (PDN) by releasing a first Internet Protocol (IP) address used to connect the wireless device to the PDN when a number of packets identified as received from the malicious source reaches a threshold number within a monitoring period, and reconnect the wireless device to the PDN using a second IP address that is different from the first IP address. In another aspect, a connection to an IP Multimedia Subsystem (IMS) PDN is maintained after the PDN is disconnected.

30 Claims, 8 Drawing Sheets

(56) References Cited

U.S. PATENT DOCUMENTS

2007/0143846 A1   6/2007   Lu
2008/0178294 A1   7/2008   Hu et al.
2009/0209291 A1   8/2009   Ramprasad et al.
2011/0249564 A1   10/2011  Cho
2012/0036266 A1   2/2012   Yin et al.
2013/0016668 A1   1/2013   Zhao et al.

OTHER PUBLICATIONS

Understanding SYN Flood Attacks, Retrieved from the Internet < URL: https://www.juniper.net/techpubs/software/junos-security/junos-security10.0/junos-security-swconfig-security/id-34128.html > [Online] Nov. 12, 2013, 6 pages.

* cited by examiner

METHODS AND SYSTEMS FOR HANDLING MALICIOUS ATTACKS IN A WIRELESS COMMUNICATION SYSTEM

BACKGROUND

Wireless communication systems are widely deployed to provide using radio signals various types of content, such as voice, data, and video, to mobile devices. Typical wireless communication systems may be multiple-access systems capable of supporting communication with multiple mobile devices by sharing available system resources (e.g., bandwidth, transmit power, etc.). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, a network element of a wireless communication system may be a source of malicious activity or malicious attacks on mobile devices within the wireless communication system. Such malicious sources may attempt to overwhelm a mobile device with unsolicited packets (commonly referred to as "flooding"). These packets force the mobile device that is in an idle or dormant state to activate its radio resources and thus transition to a connected or active state. The mobile device then remains in the connected state until no further packets are received within a time window threshold of a dormancy timer, at which point the mobile device disconnects its radio resources and transitions back into the dormant or idle state. This process of transitioning between connectivity states by the mobile device as a result of packets received from the malicious source may occur frequently, and thus may drain the mobile device's battery (e.g., reduce battery life), as well as increase network congestion.

Previous attempts to handle malicious attacks from network entities of wireless communication systems have failed to provide a permanent solution. As an example, one previous attempt in CDMA systems uses a shortened dormancy timer to reduce the amount of time the mobile device remains in the connected state before transitioning back to the dormant state after receiving packets from a malicious network entity. As another example, another previous attempt in WCDMA systems similarly implements a forced dormancy function to achieve the same kind of results as those achieved by the approach used with CDMA systems.

These previous attempts may reduce the amount of time the mobile device remains in the connected state before transitioning back to the dormant state after receiving packets from a malicious network entity, but the malicious network entity can continue to send unsolicited packets to the mobile device, and thus continue to drain the mobile device's battery and cause increased network congestion. Additionally, some wireless communication systems such as LTE do not have a mobile device-initiated forced or shortened dormancy function, and thus may not have a way of reducing the amount of time the mobile device remains in the connected state before transitioning back to the dormant state after receiving packets from a malicious network entity. As such, there is a need in the art for simple and effective methods and systems for handling malicious attacks.

SUMMARY

The following presents a simplified summary of one or more aspects of methods and systems for handling malicious attacks. This summary is not an extensive overview of all contemplated aspects of the invention, and is intended to neither identify key or critical elements of the invention nor delineate the scope of any or all aspects thereof. Its sole purpose is to present some concepts of one or more aspects in a simplified form as a prelude to the more detailed description that is presented later.

In one aspect, a method for handling malicious attacks is disclosed. The method including identifying, at a wireless device, packets received from a malicious source based at least in part on packets received by the wireless device that change a state of the wireless device from a dormant state to a connected state. The method continues by selectively disconnecting the wireless device from a packet data network (PDN) by releasing a first Internet Protocol (IP) address used to connect the wireless device to the PDN when a number of packets identified as received from the malicious source reaches a threshold number within a monitoring period. The method further continues by reconnecting the wireless device to the PDN using a second IP address that is different from the first IP address.

In another aspect, a computer program product for handling malicious attacks that includes a non-transitory computer-readable medium is disclosed. The computer-readable medium comprises code for causing a wireless device to identify packets received from a malicious source based at least in part on packets received by the wireless device that change a state of the wireless device from a dormant state to a connected state. The computer-readable medium further comprises code for causing the wireless device to selectively disconnect the wireless device from a packet data network (PDN) by releasing a first Internet Protocol (IP) address used to connect the wireless device to the PDN when a number of packets identified as received from the malicious source reaches a threshold number within a monitoring period. The computer-readable medium additionally comprises code for causing the wireless device to reconnect to the PDN using a second IP address that is different from the first IP address.

In a further aspect, an apparatus for handling malicious attacks is disclosed. The apparatus includes means for identifying, at a wireless device, packets received from a malicious source based at least in part on packets received by the wireless device that change a state of the wireless device from a dormant state to a connected state. The apparatus further comprises means for selectively disconnecting the wireless device from a packet data network (PDN) by releasing a first Internet Protocol (IP) address used to connect the wireless device to the PDN when a number of packets identified as received from the malicious source reaches a threshold number within a monitoring period. The apparatus still further comprises means for reconnecting the wireless device to the PDN using a second IP address that is different from the first IP address.

Moreover, in an aspect, a wireless device for handling malicious attacks including at least one processor is disclosed. The at least one processor is configured to identify packets received from a malicious source based at least in part on packets received by the wireless device that change a state of the wireless device from a dormant state to a connected state. The at least one processor is further configured to selectively disconnect the wireless device from a packet data network (PDN) by releasing a first Internet Protocol (IP) address used to connect the wireless device to the PDN when a number of packets identified as received from the malicious source reaches a threshold number within a monitoring period. Additionally, the at least one processor is configured to reconnect the wireless device to the PDN using a second IP address that is different from the first IP address.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
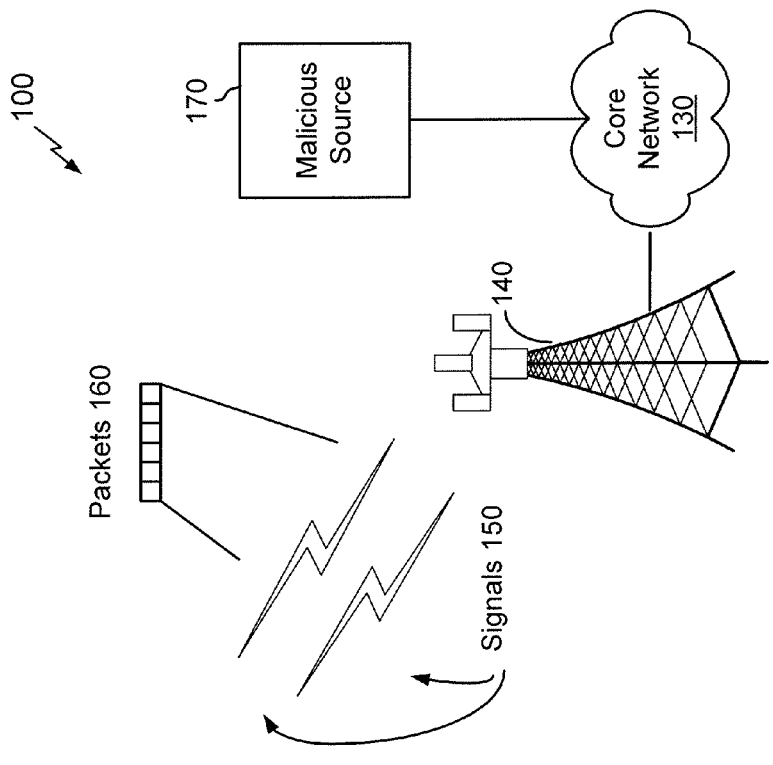
FIG. 1 is a schematic diagram of a wireless communication network including an aspect of a user equipment configured to handle malicious attacks.
Figure 1:
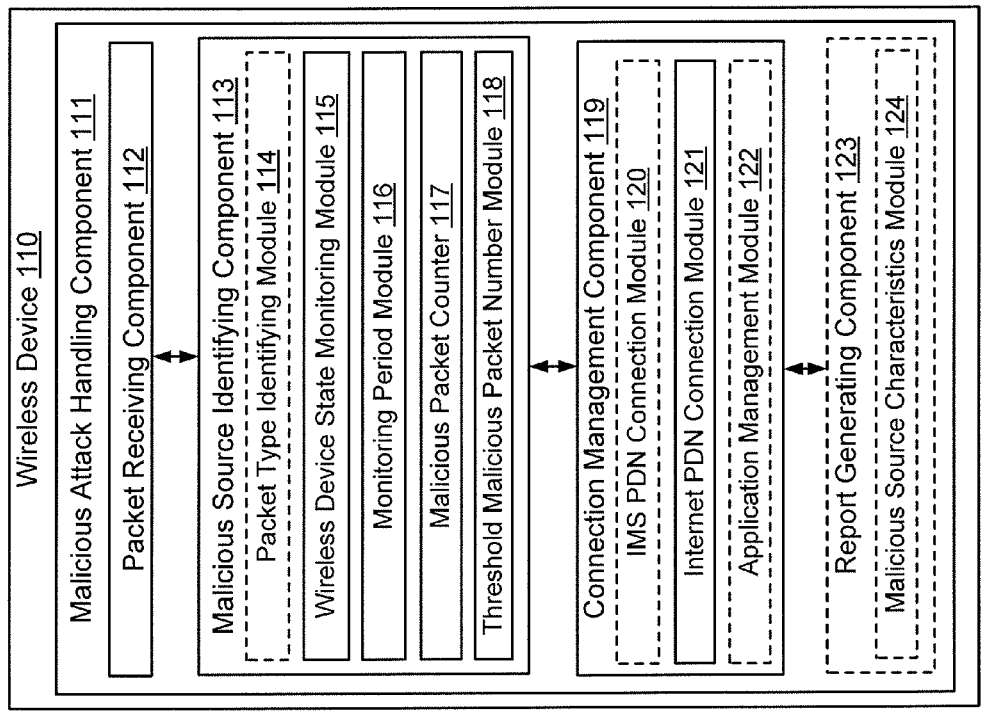

In various aspects, methods, systems, apparatus, and computer program products for handling malicious attacks are disclosed. These various aspects may generally include identifying, at a wireless device, packets received from a malicious source based at least in part on packets received by the wireless device that change a state of the wireless device from a dormant state to a connected state. The wireless device may selectively disconnect from a packet data network (PDN) by releasing a first Internet Protocol (IP) address used to connect the wireless device to the PDN when a number of packets identified as received from the malicious source reaches a threshold number within a monitoring period. The wireless device may reconnect to the PDN using a second IP address that is different from the first IP address.

The various aspects for handling malicious attacks are now described with reference to the drawings. In the following description, for purposes of explanation, numerous specific details are set forth in order to provide a thorough understanding of one or more aspects. It may be evident, however, that such aspect(s) may be practiced without these specific details.

Macrocells and small cells may be utilized for communicating with mobile devices. As generally known in the art, a mobile device can also be called a system, device, subscriber unit, subscriber station, mobile station, mobile, remote station, mobile terminal, remote terminal, access terminal, user terminal, terminal, communication device, user agent, user device, or user equipment (UE). A mobile device may be a cellular telephone, a satellite phone, a cordless telephone, a Session Initiation Protocol (SIP) phone, a wireless local loop (WLL) station, a personal digital assistant (PDA), a handheld device having wireless connection capability, a tablet, a computing device, or other processing devices connected via a wireless modem to one or more BS that provide cellular or wireless network access to the mobile device.

The techniques described herein may be used for various wireless communication systems such as CDMA, TDMA, FDMA, OFDMA, SC-FDMA, WiFi carrier sense multiple access (CSMA), and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). The various aspects may also be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. 3GPP Long Term Evolution (LTE) is a release of UMTS that uses E-UTRA, which employs OFDMA on the downlink and SC-FDMA on the uplink. The various aspects may also be extended to systems employing LTE (in FDD, TDD, or both modes), LTE-Advanced (LTE-A) (in FDD, TDD, or both modes). UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short-or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The present aspects generally relate to handling malicious attacks in wireless communication systems. Specifically a wireless device may communicate with one or more network entities in a wireless communication system. Further, one or more of the network entities may be the source of malicious attacks on the wireless device. In some non-limiting cases, a malicious attack may be considered a transmission of unsolicited packets to the wireless device from the network entity that change a state of the wireless device from a dormant state to a connected state. In such non-limiting cases, the network entity may be considered a malicious source in the wireless communications system.

Current efforts or attempts to handle malicious attacks from network entities of wireless communication systems have failed to provide a permanent solution. As an example, one previous attempt to handle malicious attacks in CDMA systems uses a shortened dormancy timer to reduce the amount of time the mobile device remains in the connected state before transitioning back to the dormant state after receiving packets from a malicious network entity. As another example, another previous attempt to handle malicious attacks in WCDMA systems similarly implements a forced dormancy function to achieve the same kind of results as those achieved by the approach used with CDMA systems.

These previous attempts may reduce the amount of time the mobile device remains in the connected state before transitioning back to the dormant state after receiving packets from a malicious network entity, but the malicious network entity can continue to send unsolicited packets to the mobile device, and thus continue to drain the mobile device's battery (e.g., reduce battery life), and further cause increased network congestion. Additionally, some systems such as LTE do not have a mobile device-initiated forced or shortened dormancy function, and thus may not have a way of reducing the amount of time the mobile device remains in the connected state before transitioning back to the dormant state after receiving packets from a malicious network entity. Therefore, there is a need in the art for simple and effective methods and systems for handling malicious attacks.

As such, according to the present methods and systems, malicious attacks may be handled by selectively disconnecting the wireless device from a packet data network (PDN) by releasing a first Internet Protocol (IP) address used to connect the wireless device to the PDN when a number of packets identified as received from the malicious source reaches a threshold number within a monitoring period, and reconnecting the wireless device to the PDN using a second IP address that is different from the first IP address. Such approach may provide a more effective solution, as compared to the current solutions, for handling malicious attacks. For example, rather than simply adjusting a dormancy timer to limit the effect of the malicious attacks on battery life, the approach outlined herein may be able to stop the attacks from the malicious source by disconnecting the wireless device from the PDN and connecting back to the PDN using a different IP address. Moreover, this may be achieved while maintaining a connection to an IP Multimedia Subsystem (IMS) PDN even after the PDN is disconnected.

Referring to FIG. 1, in one aspect, a wireless communication system 100 includes at least one wireless device 110 in communication with at least one malicious source 170. Wireless device 110 may communicate with malicious source 170 by way of, for instance, network entity 140 (e.g., base station) and core network 130. Further, wireless device 110 may receive one or more packets from malicious source 170, such as packets 160, contained in signals 150 by way of network entity 140 and core network 130. Further aspects of core network 130 are described below with respect to FIG. 4.

In some aspects, wireless device 110 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. Additionally, network entity 140 may be a macrocell, picocell, femtocell, relay, Node B, mobile Node B, UE (e.g., communicating in peer-to-peer or ad-hoc mode with wireless device 110), or substantially any type of component that can communicate with wireless device 110 to provide wireless network access at the wireless device 110.

According to the present aspects, wireless device 110 may include malicious attack handling component 111, which may be configured to handle attacks from one or more malicious sources in wireless communication system 100.

Further to the present aspects, malicious attack handling component 111 of wireless device 110 may include packet receiving component 112, which may be configured to receive one or more packets 160 contained in signals 150 from network entities such as malicious source 170, by way of network entity 140 and core network 130.

In another aspect, malicious attack handling component 111 may include malicious source identifying component 113, which may be configured to identify packets received from a malicious source. As an example, the packets received from the malicious source may be one or more of packets 160, and the malicious source may be malicious source 170.

In a further aspect, malicious source identifying component 113 may include wireless device state monitoring module 115, which may be configured to identify which packets of received packets 160 are from malicious source 170. Identifying which packets that are received from malicious source 170 may be based at least in part on which packets received by wireless device 110 change a state of wireless device 110 from a dormant state to a connected state. As an example, wireless device state monitoring module 115 may monitor the current state of wireless device 110. Further to the example, in some non-limiting cases, the current state of wireless device 110 may be a "dormant" or "idle" state, wherein the radio resources of wireless device 110 are not generally in use in wireless communication system 100. Still further to the example, wireless device 110 may be in a "connected" or "active" state, wherein the radio resources of wireless device 110 are being used for an established connection in wireless communication system 100.

Moreover in an aspect, malicious source identifying component 113 may include monitoring period module 116, which may be configured to establish and track a monitoring period for which reception and identification of malicious packets are monitored. As an example, monitoring period module 116 may establish a monitoring period as a result of malicious source identifying component 113 identifying that wireless device 110 has received a malicious packet. Further to the example, the malicious packet may cause wireless device 110 to change from a dormant state to a connected state. Further to the aspect, the duration of monitoring period may be configured by wireless device 110, a user of wireless device 110, or another network entity.

In yet another aspect, malicious source identifying component 113 may include malicious packet counter 117, which may be configured to count the number of malicious packets received by wireless device 110. In the aspect, malicious packet counter 117 may further be configured to start counting malicious packets received by wireless device 110 when malicious source identifying component 113 has identified that wireless device 110 has received a malicious packet and when monitoring period module 116 has established the monitoring period.

In still another aspect, malicious source identifying component 113 may include threshold malicious packet number module 118, which may be configured to establish a number of malicious packets that are required to be received by wireless device 110 during the monitoring period established by monitoring period module 116 before malicious attack handling component 111 implements an action against malicious source 170. Further to the aspect, the number of malicious packets required may be configured by wireless device 110, a user of wireless device 110, or another network entity.

In an optional aspect, malicious source identifying component 113 may include packet type identifying module 114, which may be configured to identify a type of malicious packet or packets received from malicious source 170. As an example, the type of malicious packet or packets received may be, but not limited to, a Transmission Control Protocol Synchronize (TCP SYN) packet, a User Datagram Protocol (UDP) packet, or an Internet Control Message Protocol (ICMP) packet.

Additionally, in an aspect, malicious attack handling component 111 may include connection management component 119, which may be configured to manage the various connections between wireless device 110 and one or more network entities in wireless communication system 100. In the aspect, connection management component 119 may manage a connection between wireless device 110 and an Internet Packet Data Network (PDN) in wireless communication system 100 using Internet PDN connection module 121. As an example, Internet PDN connection module 121 may manage an Internet Protocol (IP) address used to connect wireless device 110 to the Internet PDN.

Further to the aspect, Internet PDN connection module 121 may selectively disconnect wireless device 100 from the Internet PDN by releasing an Internet Protocol (IP) address that is used to connect wireless device 110 to the Internet PDN when a number of packets identified as received from malicious source 170 reaches a threshold number within a monitoring period. As an example, when a packet received by packet receiving component 112 is identified to be a malicious packet by malicious source identifying component 113, monitoring period module 116 may establish a monitoring period for monitoring the receiving of malicious packets. Further to the example, malicious packet counter 117 may establish a count of malicious packets received, and may increment the count of malicious packets by one for each malicious packet received during the monitoring period established by monitoring period module 116. If the number of malicious packets received, as monitored by malicious packet counter 117, reaches a threshold malicious packet number, as defined by threshold malicious packet number module 118, before the monitoring period established by monitoring period module 116 expires, then Internet PDN connection module 121 may take action.

Still further to the aspect, Internet PDN connection module 121 may take one or more of any number of actions, which may include selectively disconnecting wireless device 100 from the Internet PDN by releasing the IP address that is used to connect wireless device 110 to the Internet PDN. In another aspect, Internet PDN connection module 121 may reconnect the wireless device to the Internet PDN using a second IP address that is different from the previous IP address, that is, different from the IP address to which the malicious source 170 was sending the malicious packets.

In an optional aspect, connection management component 119 may contain application management module 122, which may be configured to determine a number of applications on wireless device 110 that are using the IP address of the connection between wireless device 110 and the Internet PDN for communications. In the optional aspect, Internet PDN connection module 121 may disconnect wireless device 110 from the Internet PDN when a determination is made by application management module 122 that only a single application on wireless device 110 is using the Internet PDN connection IP address for communications. Alternatively in the optional aspect, Internet PDN connection module 121 may maintain the connection between wireless device 110 and the Internet PDN when a determination is made by application management module 122 that more than one application on wireless device 110 is using the Internet PDN connection IP address for communications.

In an alternative aspect, Internet PDN connection module 121 may maintain the connection between wireless device 110 and the Internet PDN if the number of malicious packets received, as monitored by malicious packet counter 117, fails to reach the threshold malicious packet number, as defined by threshold malicious packet number module 118, before the monitoring period established by monitoring period module 116 expires. Further to the alternative aspect, at the expiration of the monitoring period, malicious packet counter 117 may set the count of malicious packets received to zero.

In an optional aspect, connection management component 119 may manage a connection between wireless device 110 and an IP Multimedia Subsystem (IMS) PDN in wireless communication system 100 using IMS PDN connection module 120. In the aspect, IMS PDN connection module 120 may maintain a connection between the wireless device and the IMS PDN after the Internet PDN connection module 121 has disconnected the connection between wireless device 110 and an Internet PDN in wireless communication system 110. Further to the aspect, IMS PDN connection module 120 may manage a third IP address that is used to connect wireless device 110 to the IMS PDN in wireless communication system 100.

In another option aspect, malicious attack handling component 111 may include report generating component 123, which may be configured to generate a report comprising information of one or more characteristics of malicious source 170. In the optional aspect, the generated report may be provided to a server (not shown) through wireless communication system 100. Further to the optional aspect, information of the one or more characteristics of malicious source 170 may be collected and maintained by malicious source characteristics module 124. As an example, malicious source characteristics module 124 may collect and maintain information of one or more characteristics of malicious source 170 such as the IP address used to connect wireless device 110 to the Internet PDN before the connection between wireless device 110 and the Internet PDN was selectively disconnected. As another example, malicious source characteristics module 124 may collect and maintain information of one or more characteristics of malicious source 170 such as a port number or protocol type used by malicious source 170.

Figure 2:
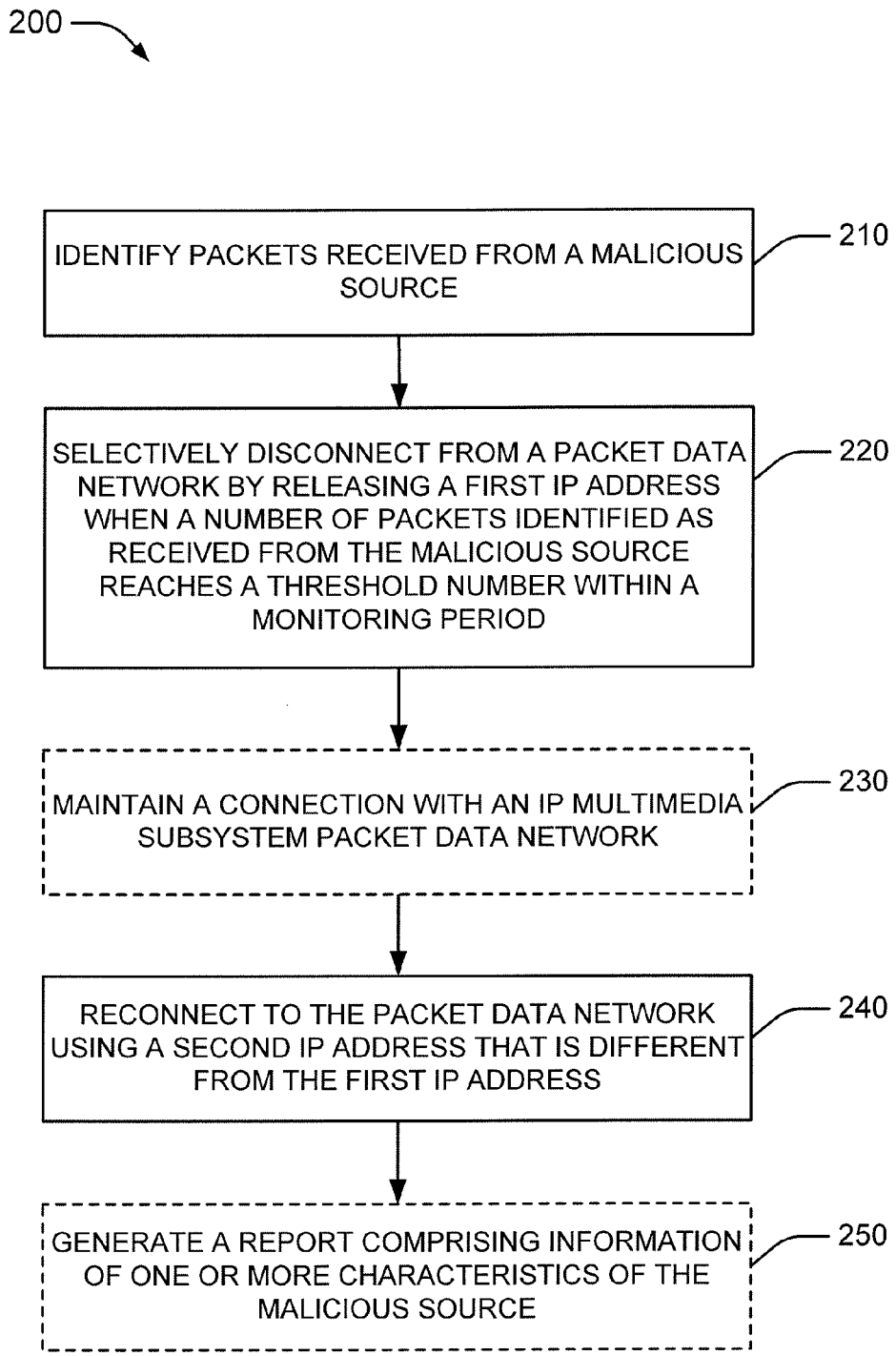
FIG. 2 is a flow diagram illustrating one example methodology for handling malicious attacks according to one aspect.

FIG. 2 illustrates an example methodology 200 for handling malicious attacks based on the principles disclosed herein. Methodology 200 may be implemented by the malicious attack handling component 111 of wireless device 110 of FIG. 1. While, for purposes of simplicity of explanation, the methodology is shown and described as a series of acts, it is to be understood and appreciated that the methodology is not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Turning to FIG. 2, at 210, method 200 includes identifying packets received from a malicious source. For example, in one aspect, malicious attack handling component 111 of wireless device 110 may execute malicious source identifying component 113 to identify packets that are received from a malicious source, such as malicious source 170 of FIG. 1, by packet receiving component 112. In the aspect, malicious source identifying component 113 may identify packets received from malicious source 170 based at least in part on packets received by packet receiving component 112 that change a state of wireless device 110 from a dormant state to a connected state, as monitored by wireless device state monitoring module 115.

The method 200 additionally includes selectively disconnecting wireless device 110 from a PDN by releasing a first IP address used to connect the wireless device to the PDN when a number of packets identified as received from the malicious source reaches a threshold number within a monitoring period. In an aspect, the PDN may be Internet PDN 430 of FIG. 4. Further to the aspect, malicious source identifying component 113 may execute malicious packet counter 117 (FIG. 1) to count a number of malicious packets received by wireless device 110. Still further to the aspect, malicious packet counter 117 may be executed to start counting malicious packets when malicious source identifying component 113 has identified that wireless device 110 has received a malicious packet and that monitoring period module 116 (FIG. 1) has been executed to establish a period for monitoring received malicious packets.

In another aspect, connection management component 119 (FIG. 1) of wireless device 110 may execute Internet PDN connection module 121 (FIG. 1) to determine whether the count of received malicious packets, as maintained by malicious packet counter 117, has reached a threshold malicious packet number, as established by threshold malicious packet number module 118 (FIG. 1), before the monitoring period established by monitoring period module 116 has expired. Further to the aspect, if Internet PDN connection module 121 has determined that the number of packets identified as received from the malicious source reaches a threshold number within a monitoring period, then Internet PDN connection module 121 selectively disconnects wireless device 110 from the PDN by releasing a first Internet Protocol (IP) address used to connect wireless device 110 to the PDN. As an example, the first IP address may be a public IP address. As another example, the threshold malicious packet number may be configured. As a further example, the monitoring period may be configurable.

Figure 4:
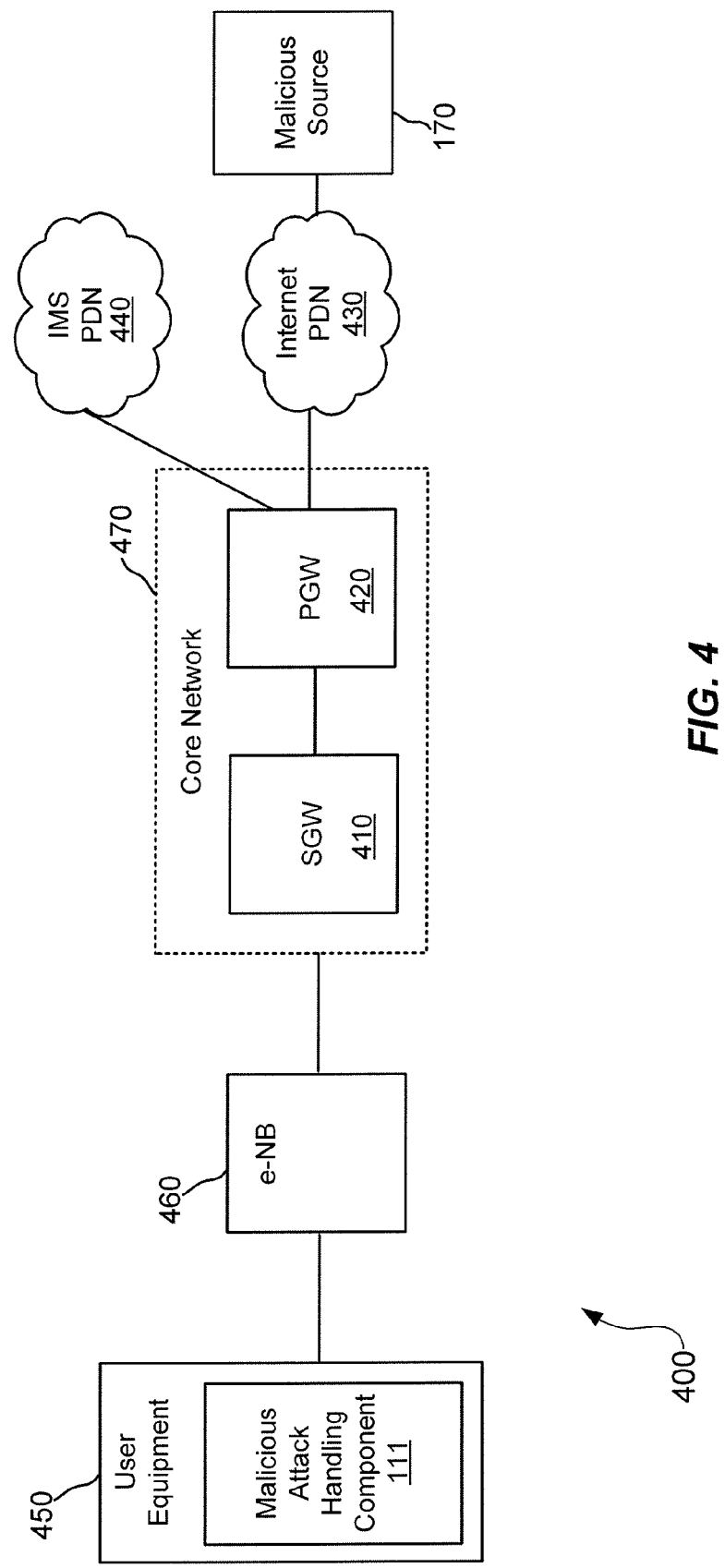
FIG. 4 is an illustration of an example wireless network environment that can be employed in conjunction with the various systems and methods described herein.

Optionally, method 200 may include maintaining a connection between wireless device 110 and an IMS PDN, such as IMS PDN 430 of FIG. 4, after the PDN has been disconnected from wireless device 110 at 230. In an option aspect, IMS PDN connection module 120 (FIG. 1) may executed by connection management component 119 to maintain the connection between wireless device 110 and the IMS PDN after the Internet PDN connection module 121 has disconnected the connection between wireless device 110 and the Internet PDN. Further to the option aspect aspect, a third IP address may be used to connect wireless device 110 to the IMS PDN.

At 240, method 200 may include reconnecting wireless device 110 to the PDN using a second IP address that is different from the first IP address.

Optionally, method 200 may include generating a report comprising information of one or more characteristics of malicious source 170 at 250, wherein the report is provided to a server. In an optional aspect, the information of one or more characteristics of malicious source 170 may comprise information of the first IP address used to connect the wireless device to the PDN. In another option aspect, the information of one or more characteristics of malicious source 170 may comprise information of a port number used by malicious source 170. Moreover, in an optional aspect, the information of one or more characteristics of malicious source 170 may comprise information of a protocol type used by malicious source 170.

Figure 3:
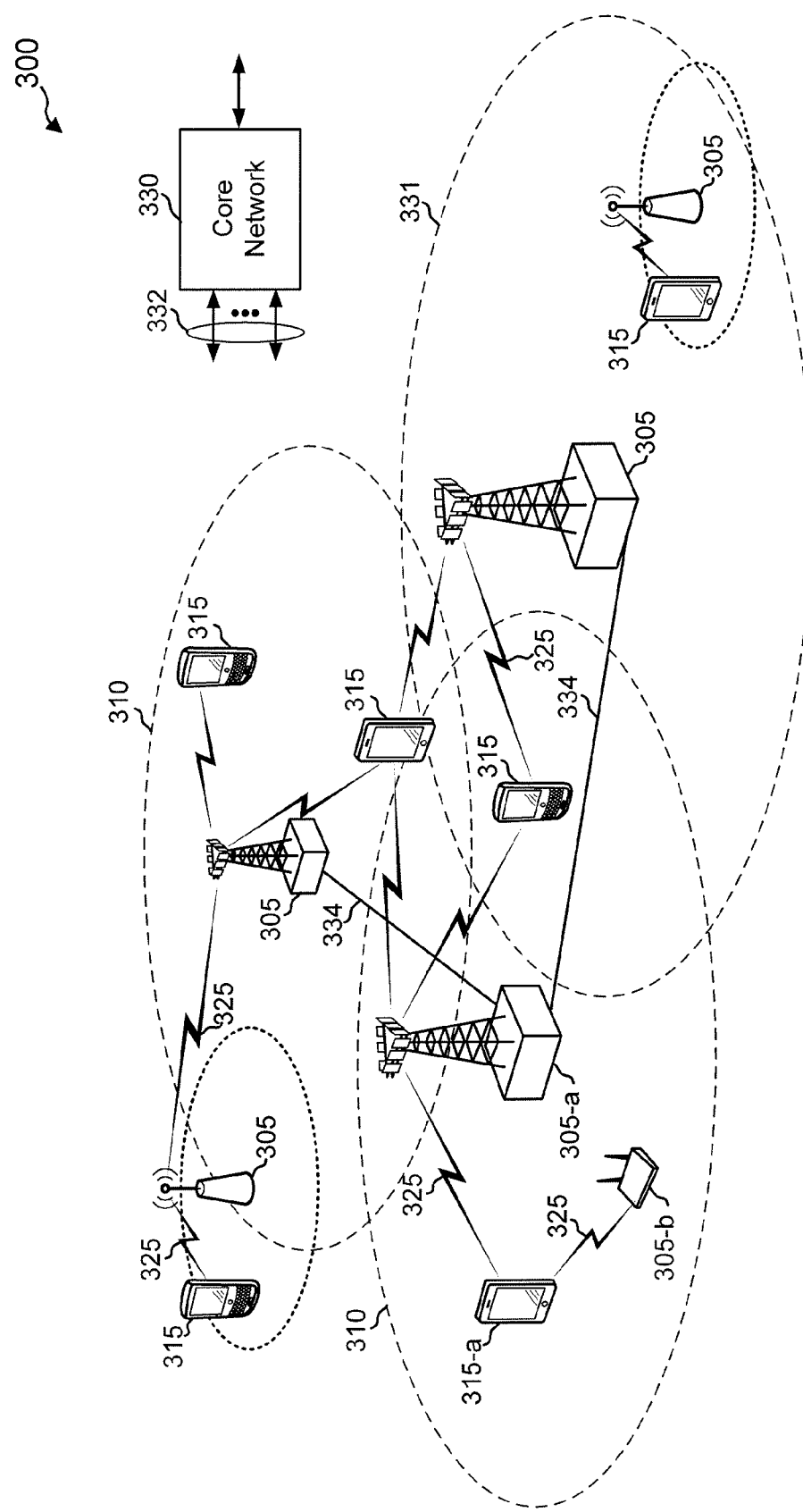
FIG. 3 is a block diagram conceptually illustrating an example of a telecommunications system.

FIG. 3 is a block diagram conceptually illustrating an example of a wireless communications system 300, in accordance with the methods and systems for handling malicious attacks. The wireless communications system 300 includes base stations (or cells) 305, such as network entity 140 of FIG. 1, user equipment (UEs) 315, such as wireless device 110 of FIG. 1, and a core network 330, such as core network 130 of FIG. 1. The base stations 305 may communicate with the UEs 315 under the control of a base station controller (not shown), which may be part of the core network 330 or the base stations 305 in various embodiments. The base stations 305 may communicate control information and/or user data with the core network 330 through first backhaul links 332. In embodiments, the base stations 305 may communicate, either directly or indirectly, with each other over second backhaul links 334, which may be wired or wireless communication links. The wireless communications system 300 may support operation on multiple carriers (waveform signals of different frequencies). Multi-carrier transmitters can transmit modulated signals simultaneously on the multiple carriers. For example, each communication link 325 may be a multi-carrier signal modulated according to the various radio technologies described above. Each modulated signal may be sent on a different carrier and may carry control information (e.g., reference signals, control channels, etc.), overhead information, data, etc.

The base stations 305 may wirelessly communicate with the UEs 315 via one or more base station antennas. Each of the base stations 305 sites may provide communication coverage for a respective geographic coverage area 310. In some embodiments, base stations 305 may be referred to as a base transceiver station, a radio base station, an access point, a radio transceiver, a basic service set (BSS), an extended service set (ESS), a NodeB, eNodeB, Home NodeB, a Home eNodeB, or some other suitable terminology. The geographic coverage area 310 for a base station 305 may be divided into sectors making up only a portion of the coverage area (not shown). The wireless communications system 300 may include base stations 305 of different types (e.g., macro, micro, and/or pico base stations). There may be overlapping coverage areas for different technologies.

In embodiments, the wireless communications system 300 is an LTE/LTE-A network communication system. In LTE/LTE-A network communication systems, the terms evolved Node B (eNodeB) may be generally used to describe the base stations 305. The wireless communications system 300 may be a Heterogeneous LTE/LTE-A network in which different types of eNodeBs provide coverage for various geographical regions. For example, each eNodeB 305 may provide communication coverage for a macro cell, a pico cell, a femto cell, and/or other types of cell. A macro cell generally covers a relatively large geographic area (e.g., several kilometers in radius) and may allow unrestricted access by UEs 315 with service subscriptions with the network provider. A pico cell would generally cover a relatively smaller geographic area (e.g., buildings) and may allow unrestricted access by UEs 315 with service subscriptions with the network provider. A femto cell would also generally cover a relatively small geographic area (e.g., a home) and, in addition to unrestricted access, may also provide restricted access by UEs 315 having an association with the femto cell (e.g., UEs 315 in a closed subscriber group (CSG), UEs 315 for users in the home, and the like). An eNodeB 305 for a macro cell may be referred to as a macro eNodeB. An eNodeB 305 for a pico cell may be referred to as a pico eNodeB. And, an eNodeB 305 for a femto cell may be referred to as a femto eNodeB or a home eNodeB. An eNodeB 305 may support one or multiple (e.g., two, three, four, and the like) cells.

The core network 330 may communicate with the eNodeBs 330 or other base stations 330 via first backhaul links 332 (e.g., S1 interface, etc.). The eNodeBs 330 may also communicate with one another, e.g., directly or indirectly via second backhaul links 334 (e.g., X2 interface, etc.) and/or via the first backhaul links 332 (e.g., through core network 330). The wireless communications system 300 may support synchronous or asynchronous operation. For synchronous operation, the eNodeBs 305 may have similar frame timing, and transmissions from different eNodeBs 305 may be approximately aligned in time. For asynchronous operation, the eNodeBs 305 may have different frame timing, and transmissions from different eNodeBs 305 may not be aligned in time. The techniques described herein may be used for either synchronous or asynchronous operations.

The UEs 315 may be dispersed throughout the wireless communications system 300, and each UE 315 may be stationary or mobile. A UE 315 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 315 may be a cellular phone, a personal digital assistant (PDA), a wireless modem, a wireless communication device, a handheld device, a tablet computer, a laptop computer, a cordless phone, a wireless local loop (WLL) station, or the like. A UE 315 may be able to communicate with macro eNodeBs, pico eNodeBs, femto eNodeBs, relays, and the like.

The communication links 325 shown in the wireless communications system 300 may include uplink (UL) transmissions from a UE 315 (e.g., wireless device 110 of FIG. 1) to an eNodeB 305 (e.g., network entity 140 of FIG. 1), and/or downlink (DL) transmissions, from an eNodeB 305 to a UE 315. The downlink transmissions may also be called forward link transmissions while the uplink transmissions may also be called reverse link transmissions.

In certain examples, a UE 315 may be capable of simultaneously communicating with multiple eNodeBs 305. When multiple eNodeBs 305 support a UE 315 one of the eNodeBs 305 may be designated as the anchor eNodeB 305 for that UE 315, and one or more other eNodeBs 305 may be designated as the assisting eNodeBs 305 for that UE 315. For example, an assisting eNodeB 305 is associated with a local gateway communicatively coupled to a packet data network (PDN), core network resources may be conserved by offloading a portion of network traffic between the UE 315 and that PDN through the local gateway of the assisting eNodeB 305 rather than transmitting the traffic through the core network 330. For example, a Selected IP Traffic Offload (SIPTO) PDN connection may be set up at the assisting eNodeB 305 for the UE 315.

Current wireless communications systems may limit SIPTO support to anchor eNodeBs 305, and do not provide a way to enable SIPTO for a UE 315 at an assisting eNodeB 305. As demonstrated by the description of the ensuing Figures, however, the present disclosure provides methods and apparatus for setting up and tearing down SIPTO PDN connections at assisting eNodeBs 305 at least with respect to handling malicious connections.

FIG. 4 is an illustration of an example wireless network environment that can be employed in conjunction with the various systems and methods for handling malicious attacks described herein. In an aspect, the wireless communication system 400 shown may include a multi-mode UE 450, such as wireless device 110 of FIG. 1, an eNodeB 460, such as network entity 140 of FIG. 1, an evolved packet core (EPC) 470, such as core network 130 of FIG. 1, one or more PDN's such as Internet PDN 430 and IMS PDN 440, and a peer entity such as malicious source 170 of FIG. 1. The EPC 470 may include a serving gateway (SGW) 410, and a PDN gateway (PGW) 420. The UE 450 may include malicious attack handling component 111. These elements may represent aspects of one or more of their counterparts described above with reference to the previous Figures.

In a further aspect, the eNodeB 460 may be capable of providing the UE 450 with access to Internet PDN 430 and IMS PDN 440 using the aggregation of one or more LTE component carriers or one or more WLAN component carriers. Using this access Internet PDN 430, the UE 450 may communicate with malicious source 170. The eNodeB 460 may provide access to the Internet PDN 430 through the evolved packet core 470.

All user IP packets transmitted over LTE may be transferred through eNodeB 460 to the SGW 410, which may be connected to the PDN gateway 420 over an S5 signaling interface. The SGW 410 may reside in the user plane and act as a mobility anchor for inter-eNodeB handovers and handovers between different access technologies. The PDN gateway 420 may provide UE IP address allocation as well as other functions.

The PDN gateway 420 may provide connectivity to one or more external packet data networks, such as Internet PDN 430 or IMS PDN 440, over an SGi signaling interface. In the present example, user plane data between the UE 450 and the EPC 470 may traverse the same set of one or more EPS bearers.

Figure 5:
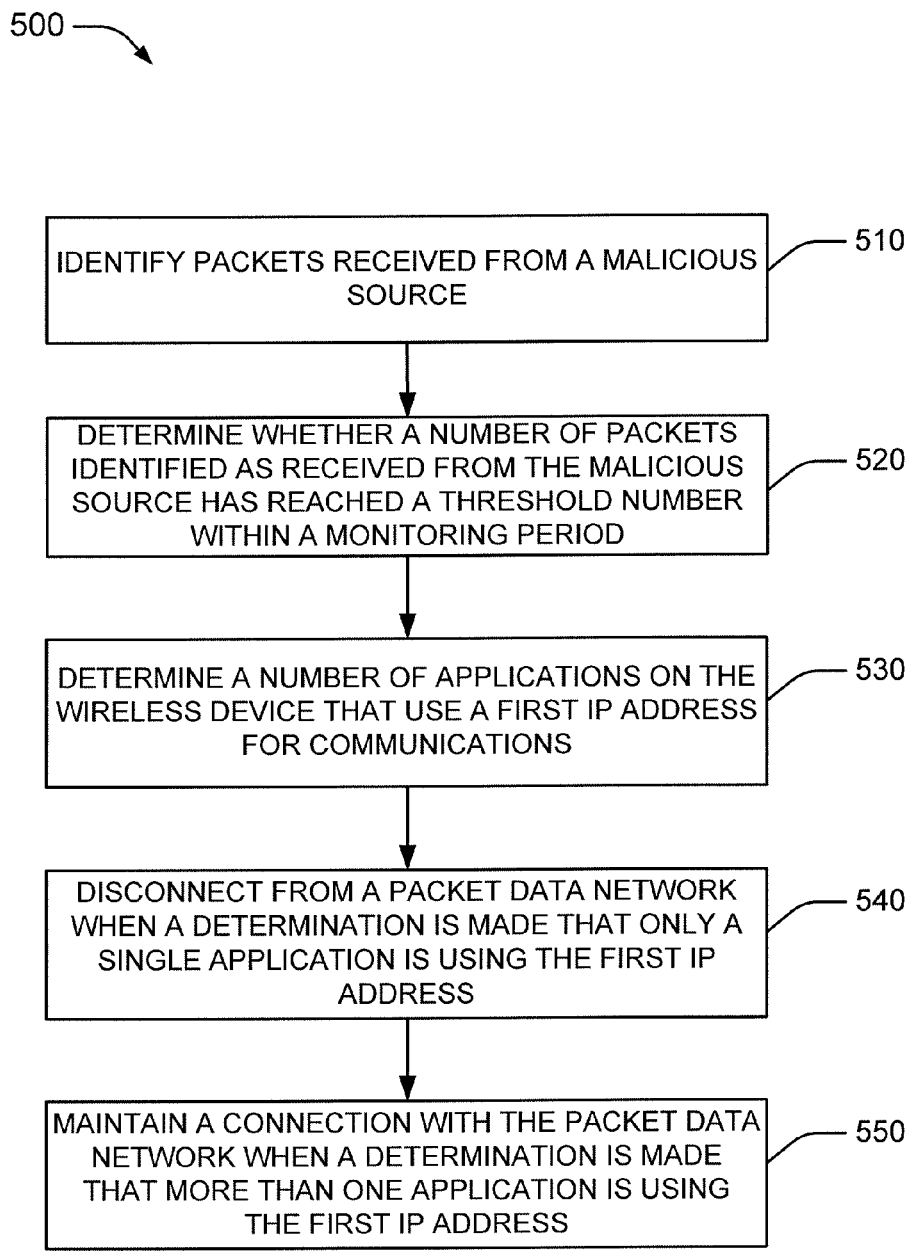
FIG. 5 is a flow diagram illustrating an example methodology for handling malicious attacks according to another aspect.

FIG. 5 illustrates another example methodology 500 for handling malicious attacks based on the principles disclosed herein. Methodology 500 may be implemented by the malicious attack handling component 111 of wireless device 110 of FIG. 1. While, for purposes of simplicity of explanation, the methodology is shown and described as a series of acts, it is to be understood and appreciated that the methodology is not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments. In addition, various aspects of methodology 200 in FIG. 2 may be combined with various aspects of methodology 500.

Turning to FIG. 5, at 510, method 500 includes identifying packets received from a malicious source. For example, in one aspect, malicious attack handling component 111 of wireless device 110 may execute malicious source identifying component 113 to identify packets that are received from a malicious source, such as malicious source 170 of FIG. 1, by packet receiving component 112. In the aspect, malicious source identifying component 113 may identify packets received from malicious source 170 based at least in part on packets received by packet receiving component 112 that change a state of wireless device 110 from a dormant state to a connected state, as monitored by wireless device state monitoring module 115.

Method 500 additionally includes determining whether a number of packets identified as received from the malicious source reaches a threshold number within a monitoring period at 520. In an aspect, malicious source identifying component 113 may execute malicious packet counter 117 (FIG. 1) to count a number of malicious packets received by wireless device 110. Still further to the aspect, malicious packet counter 117 may be executed to start counting malicious packets when malicious source identifying component 113 has identified that wireless device 110 has received a malicious packet and that monitoring period module 116 (FIG. 1) has been executed to establish a period for monitoring received malicious packets.

In another aspect, connection management component 119 (FIG. 1) of wireless device 110 may execute Internet PDN connection module 121 (FIG. 1) to determine whether the count of received malicious packets, as maintained by malicious packet counter 117, has reached a threshold malicious packet number, as established by threshold malicious packet number module 118 (FIG. 1), before the monitoring period established by monitoring period module 116 has expired.

Moreover, method 500 includes determining a number of applications on wireless device 110 that are using a first IP address of a connection between wireless device 110 and a PDN for communications at 530. An application may refer to a program or group of programs that are configured to perform certain functions and/or have certain features that enable an end user to carry out particular tasks in a wireless device. In an aspect, connection management component 119 (FIG. 1) may execute application management module 122 to determine a number of applications on wireless device 110 that are using a first IP address of a connection between wireless device 110 and a PDN for communications.

At 540, method 500 includes disconnecting wireless device 110 from the PDN when a determination is made that only a single application on wireless device 100 uses the first IP address for communications. In an aspect, Internet PDN connection module 121 may be executed to disconnect wireless device 110 from the PDN when application management module 122 determines that only a single application of wireless device 110 is using the first IP address for communications.

Alternatively, at 550, method 500 may include maintaining a connection between wireless device 110 and the PDN when a determination is made that more than one application on wireless device 110 uses the first IP address for communications. In an aspect, Internet PDN connection module 121 may be executed to maintain the connection between wireless device 110 and the PDN when application management module 122 determines that more than one application on wireless device 110 is using the first IP address for communications.

Figure 6:
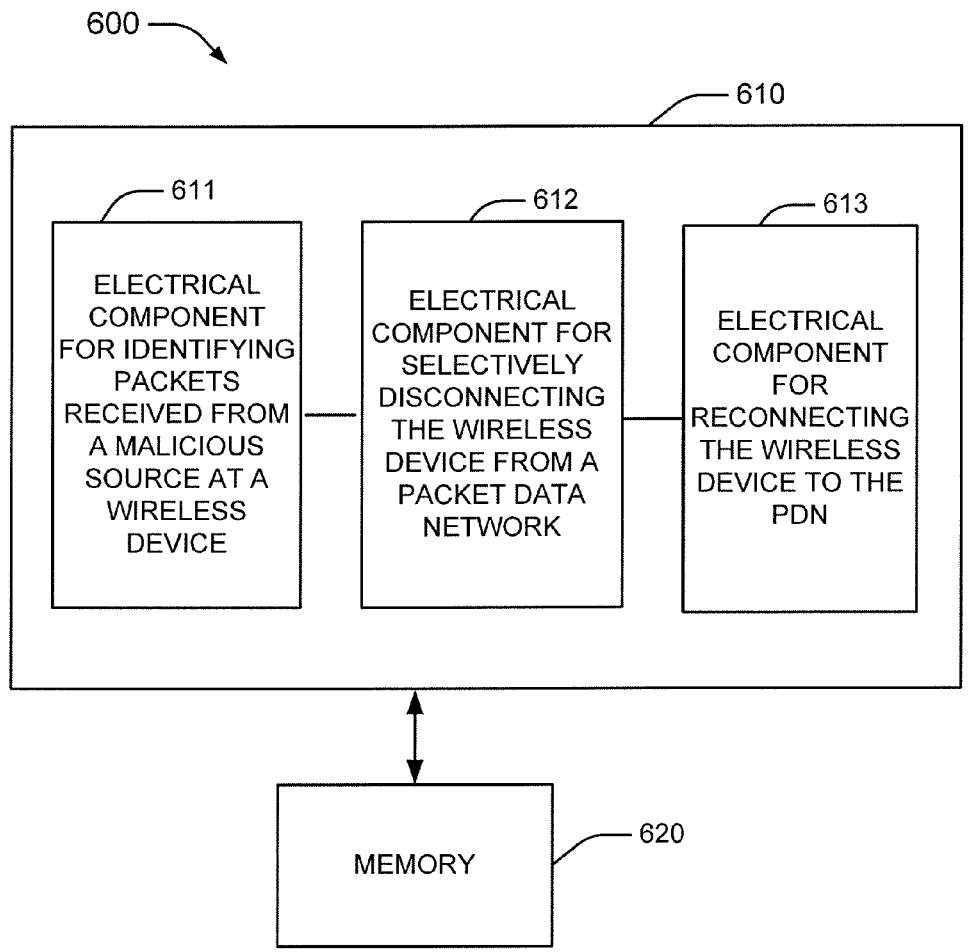
FIG. 6 is a block diagram illustrating an example system for handling malicious attacks according to one aspect.

FIG. 6 illustrates a system 600 for handling malicious attacks based on the principles disclosed herein. For example, system 600 can be implemented in wireless device 110 of FIG. 1. Further to the example, one or more of the components of the malicious attack handling component 111 may be used to implement system 600. It is to be appreciated that system 600 is represented as including functional blocks, which can be functional blocks that represent functions implemented by a processor, software, or combination thereof (e.g., firmware). System 600 includes a logical grouping 610 of electrical components that can act in conjunction. For instance, logical grouping 610 can include an electrical component 611 for identifying packets received from a malicious source at wireless device 110. Further, logical grouping 610 can comprise an electrical component 612 for selectively disconnecting wireless device 110 from a packet data network, such as Internet PDN 430 of FIG. 4. Further, logical grouping 600 can include an electrical component 613 for reconnecting wireless device 110 to Internet PDN 430.

Additionally, system 600 can include a memory 620 that retains instructions for executing functions associated with the electrical components 611-613. While shown as being external to memory 620, it is to be understood that one or more of the electrical components 611-613 can exist within memory 620. In one example, electrical components 611-613 can comprise at least one processor, or each electrical component 611-613 can be a corresponding module of at least one processor. Moreover, in an additional or alternative example, electrical components 611-613 can be a computer program product comprising a computer readable medium, where each electrical component 611-613 can be corresponding code.

Figure 7:
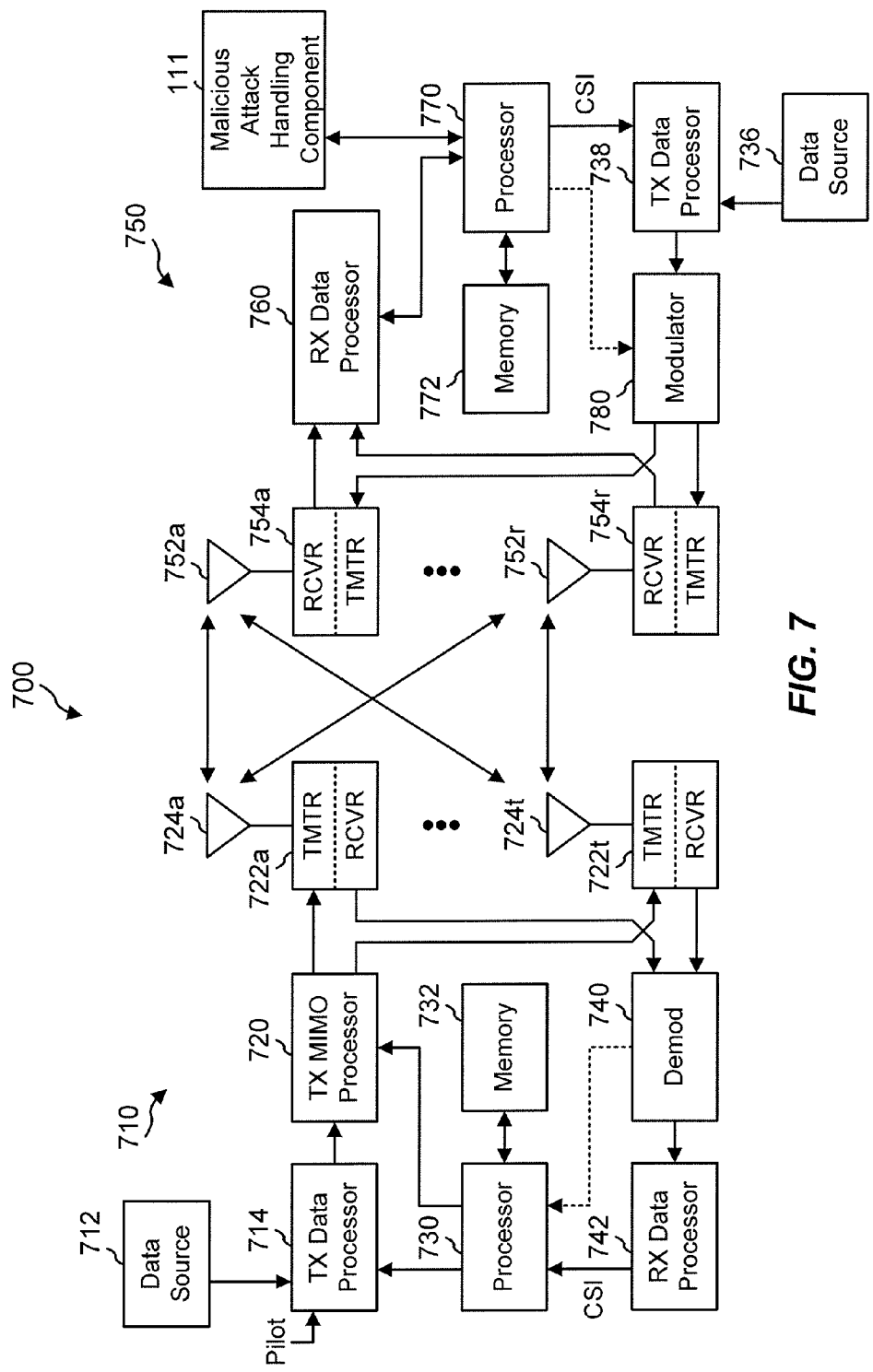
FIG. 7 is an illustration of an example wireless network environment that can be employed in conjunction with the various systems and methods described herein.

FIG. 7 shows an example wireless communication system 700 in which mechanisms for handling malicious attacks may be implemented. The wireless communication system 700 depicts one base station 710, which may be network entity 140 of FIG. 1, and one mobile device 750 for sake of brevity, such as wireless device 110 of FIG. 1, which may include malicious attack handling component 111. However, it is to be appreciated that system 700 can include more than one base station and/or more than one mobile device, wherein additional base stations and/or mobile devices can be substantially similar or different from example base station 710 and mobile device 750 described below. In addition, it is to be appreciated that base station 710 and/or mobile device 750 can employ the systems (FIGS. 1, 3, and 4) and/or methods (FIGS. 2 and 5) described herein to facilitate wireless communication there between. For example, components or functions of the systems and/or methods described herein can be part of a memory 732 and/or 772 or processors 730 and/or 770 described below, and/or can be executed by processors 730 and/or 770 to perform the disclosed functions. In other aspects, features and/or functions of malicious attack handling component 111 may be implemented using one or more of the other components of mobile device 750.

At base station 710, traffic data for a number of data streams is provided from a data source 712 to a transmit (TX) data processor 714. According to an example, each data stream can be transmitted over a respective antenna. TX data processor 714 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 750 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 730.

The modulation symbols for the data streams can be provided to a TX MIMO processor 720, which can further process the modulation symbols (e.g., for OFDM). TX MIMO processor 720 then provides NT modulation symbol streams to NT transmitters (TMTR) 722a through 722t. In various embodiments, TX MIMO processor 720 applies beamforming weights to the symbols of the data streams and to the antenna from which the symbol is being transmitted.

Each transmitter 722 receives and processes a respective symbol stream to provide one or more analog signals, and further conditions (e.g., amplifies, filters, and upconverts) the analog signals to provide a modulated signal suitable for transmission over the MIMO channel. Further, NT modulated signals from transmitters 722a through 722t are transmitted from NT antennas 724a through 724t, respectively.

At mobile device 750, the transmitted modulated signals are received by NR antennas 752a through 752r and the received signal from each antenna 752 is provided to a respective receiver (RCVR) 754a through 754r. Each receiver 754 conditions (e.g., filters, amplifies, and downconverts) a respective signal, digitizes the conditioned signal to provide samples, and further processes the samples to provide a corresponding "received" symbol stream.

An RX data processor 760 can receive and process the NR received symbol streams from NR receivers 754 based on a particular receiver processing technique to provide NT "detected" symbol streams. RX data processor 760 can demodulate, deinterleave, and decode each detected symbol stream to recover the traffic data for the data stream. The processing by RX data processor 760 is complementary to that performed by TX MIMO processor 720 and TX data processor 714 at base station 710.

The reverse link message can comprise various types of information regarding the communication link and/or the received data stream. The reverse link message can be processed by a TX data processor 738, which also receives traffic data for a number of data streams from a data source 736, modulated by a modulator 780, conditioned by transmitters 754a through 754r, and transmitted back to base station 710.

At base station 710, the modulated signals from mobile device 750 are received by antennas 724, conditioned by receivers 722, demodulated by a demodulator 740, and processed by a RX data processor 742 to extract the reverse link message transmitted by mobile device 750. Further, processor 730 can process the extracted message to determine which precoding matrix to use for determining the beamforming weights.

Processors 730 and 770 can direct (e.g., control, coordinate, manage, etc.) operation at base station 710 and mobile device 750, respectively. Respective processors 730 and 770 can be associated with memory 732 and 772 that store program codes and data. Processors 730 and 770 can also perform functionalities described herein to support selecting a paging area identifier for one or more low power nodes.

Figure 8:
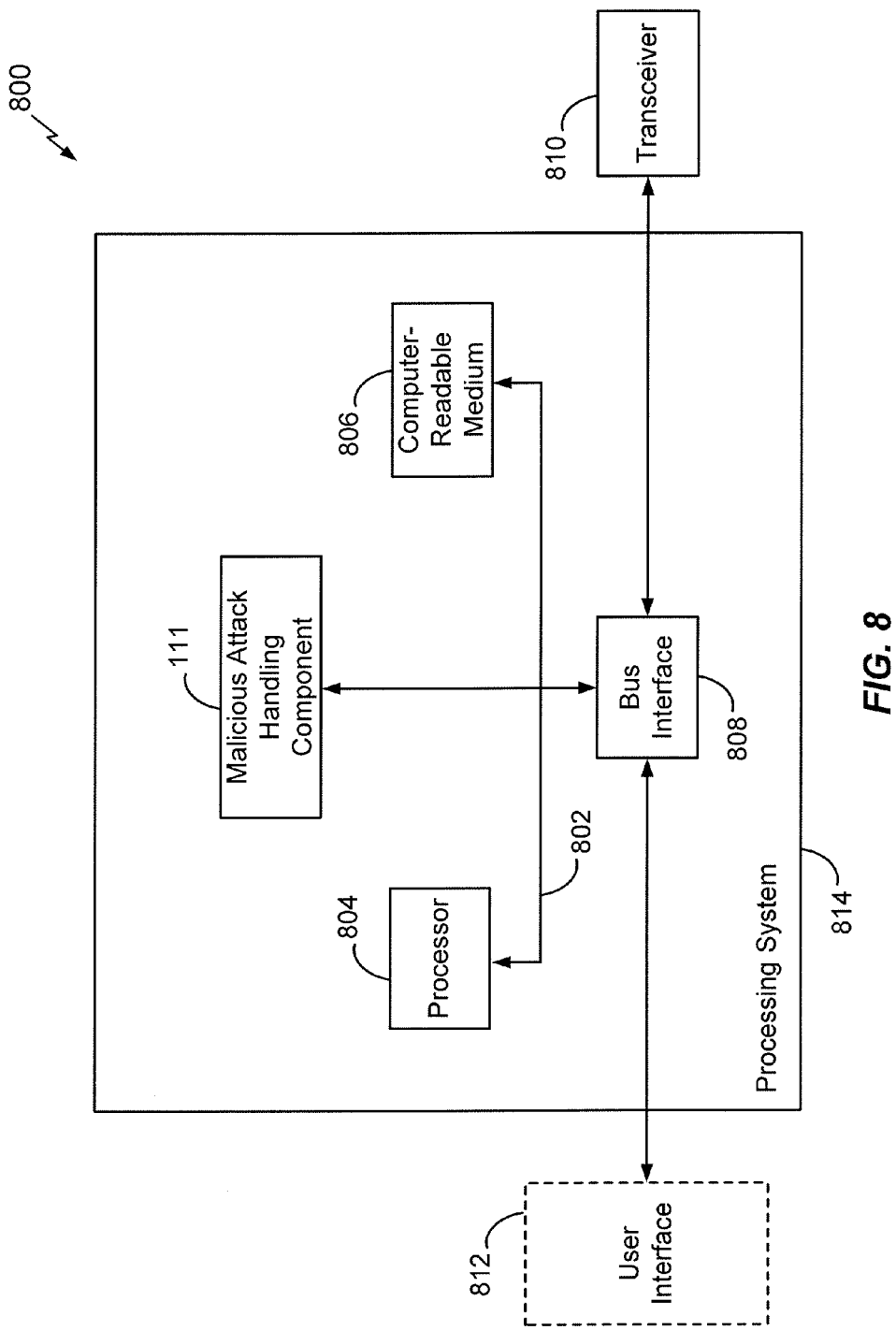
FIG. 8 is a diagram illustrating an example of a hardware implementation for an apparatus employing a processing system.

FIG. 8 is a block diagram illustrating an example of a hardware implementation for an apparatus 800 employing a processing system 814. In this example, the processing system 814 may be implemented with a bus architecture, represented generally by the bus 802. The bus 802 may include any number of interconnecting buses and bridges depending on the specific application of the processing system 814 and the overall design constraints. The bus 802 links together various circuits including one or more processors (represented generally by the processor 804), computer-readable media (represented generally by the computer-readable medium 806), and one or more malicious attack handling components (represented generally by malicious attack handling component 111). The functions and features of malicious attack handling component 111 are not limited to being implemented in malicious attack handling component 111 and may be implemented in processor 804, computer-readable medium 806, or both.

The bus 802 may also link various other circuits such as timing sources, peripherals, voltage regulators, and power management circuits, which are well known in the art, and therefore, will not be described any further. A bus interface 808 provides an interface between the bus 802 and a transceiver 810. The transceiver 810 provides a means for communicating with various other apparatus over a transmission medium. Depending upon the nature of the apparatus, a user interface 812 (e.g., keypad, display, speaker, microphone, joystick) may also be provided.

The processor 804 is responsible for managing the bus 802 and general processing, including the execution of software stored on the computer-readable medium 806. The software, when executed by the processor 804, causes the processing system 814 to perform the various functions described herein for any particular apparatus. For example, the processing system 814 may perform various functions associated with determining one or more channel metrics, identifying a change in a reachability state based at least in part on one or more channel metrics, and adjusting a transmission of connectivity signals to a server from an application running or executing on the processing system 814, where the adjusting may be based at least in part on an indication of the change in the reachability state provided to the application via an interface in communication with a modem. Although a modem is not shown, a modem may be in communication with the processing system 814. Moreover, a modem may be implemented as part of the transceiver 810 of FIG. 8. The computer-readable medium 806 may also be used for storing data that is manipulated by the processor 804 when executing software.

Several aspects of a telecommunications system have been presented with reference to a LTE/LTE-A system. As those skilled in the art will readily appreciate, various aspects described throughout this disclosure may be extended to other telecommunication systems, network architectures and communication standards.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for handling malicious attacks, comprising identifying, at a wireless device, packets received from a malicious source based at least in part on the packets received by the wireless device from the malicious source changing a state of the wireless device from a dormant state to a connected state;
selectively disconnecting the wireless device from a packet data network (PDN) by releasing a first Internet Protocol (IP) address used to connect the wireless device to the PDN when a number of the packets identified as received from the malicious source changing the state of the wireless device reaches a threshold number within a monitoring period; and
reconnecting the wireless device to the PDN using a second IP address that is different from the first IP address.

2. The method of claim 1, wherein the first IP address comprises a public IP address.

3. The method of claim 1, further comprising maintaining a connection between the wireless device and an IP Multimedia Subsystem (IMS) PDN after the PDN has been disconnected from the wireless device.

4. The method of claim 3, wherein a third IP address is used to connect the wireless device to the IMS PDN.

5. The method of claim 1, wherein selectively disconnecting the wireless device from the PDN comprises:
determining a number of applications on the wireless device that use the first IP address for communications; and
disconnecting the wireless device from the PDN when a determination is made that only a single application on the wireless device uses the first IP address for communications.

6. The method of claim 5, further comprising maintaining a connection between the wireless device and the PDN when a determination is made that more than one application on the wireless device uses the first IP address for communications.

7. The method of claim 1, wherein at least one of the packets identified as received from the malicious source changing the state of the wireless device comprises one of a Transmission Control Protocol Synchronize (TCP SYN) packet, a User Datagram Protocol (UDP) packet, or an Internet Control Message Protocol (ICMP) packet.

8. The method of claim 1, further comprising setting a counter corresponding to the number of packets identified as received from the malicious source changing the state of the wireless device to zero when the monitoring period expires.

9. The method of claim 1, wherein the duration of the monitoring period is configurable.

10. The method of claim 1, wherein the threshold number is configurable.

11. The method of claim 1, further comprising generating a report comprising information of one or more characteristics of the malicious source, wherein the report is provided to a server.

12. The method of claim 11, wherein the information of one or more characteristics of the malicious source comprises information of the first IP address used to connect the wireless device to the PDN.

13. The method of claim 11, wherein the information of one or more characteristics of the malicious source comprises information of a port number used by the malicious source.

14. The method of claim 11, wherein the information of one or more characteristics of the malicious source comprises information of a protocol type used by the malicious source.

15. A computer program product for handling malicious attacks, comprising:
a non-transitory computer-readable medium comprising:
code for causing a wireless device to identify packets received from a malicious source based at least in part on the packets received by the wireless device from the malicious source changing a state of the wireless device from a dormant state to a connected state;
code for causing the wireless device to selectively disconnect the wireless device from a packet data network (PDN) by releasing a first Internet Protocol (IP) address used to connect the wireless device to the PDN when a number of the packets identified as received from the malicious source changing the state of the wireless device reaches a threshold number within a monitoring period; and code for causing the wireless device to reconnect to the PDN using a second IP address that is different from the first IP address.

16. An apparatus for handling malicious attacks, the apparatus comprising:

means for identifying, at a wireless device, packets received from a malicious source based at least in part on the packets received by the wireless device from the malicious source changing a state of the wireless device from a dormant state to a connected state;

means for selectively disconnecting the wireless device from a packet data network (PDN) by releasing a first Internet Protocol (IP) address used to connect the wireless device to the PDN when a number of the packets identified as received from the malicious source changing the state of the wireless device reaches a threshold number within a monitoring period; and means for reconnecting the wireless device to the PDN using a second IP address that is different from the first IP address.

17. A wireless device for handling malicious attacks, the wireless device comprising:

at least one processor, wherein the at least one processor is configured to identify packets received from a malicious source based at least in part on the packets received by the wireless device from the malicious source changing a state of the wireless device from a dormant state to a connected state;

selectively disconnect the wireless device from a packet data network (PDN) by releasing a first Internet Protocol (IP) address used to connect the wireless device to the PDN when a number of the packets identified as received from the malicious source changing the state of the wireless device reaches a threshold number within a monitoring period; and reconnect the wireless device to the PDN using a second IP address that is different from the first IP address.

18. The wireless device of claim 17, wherein the first IP address comprises a public IP address.

19. The wireless device of claim 17, wherein the at least one processor is configured to maintain a connection between the wireless device and an IP Multimedia Subsystem (IMS) PDN after the PDN has been disconnected from the wireless device.

20. The wireless device of claim 19, wherein a third IP address is used to connect the wireless device to the IMS PDN.

21. The wireless device of claim 17, wherein selectively disconnecting the wireless device from the PDN comprises:

determining a number of applications on the wireless device that use the first IP address for communications; and disconnecting the wireless device from the PDN when a determination is made that only a single application on the wireless device uses the first IP address for communications.

22. The wireless device of claim 21, wherein the at least one processor is configured to maintain a connection between the wireless device and the PDN when a determination is made that more than one application on the wireless device uses the first IP address for communications.

23. The wireless device of claim 17, wherein at least one of the packets identified as received from the malicious source changing the state of the wireless device comprises one of a Transmission Control Protocol Synchronize (TCP SYN) packet, a User Datagram Protocol (UDP) packet, or an Internet Control Message Protocol (ICMP) packet.

24. The wireless device of claim 17, further comprising setting a counter corresponding to the number of packets identified as received from the malicious source changing the state of the wireless device to zero when the monitoring period expires.

25. The wireless device of claim 17, wherein the duration of the monitoring period is configurable.

26. The wireless device of claim 17, wherein the threshold number is configurable.

27. The wireless device of claim 17, wherein the at least one processor is configured to generate a report comprising information of one or more characteristics of the malicious source, wherein the report is provided to a server.

28. The wireless device of claim 27, wherein the information of one or more characteristics of the malicious source comprises information of the first IP address used to connect the wireless device to the PDN.

29. The wireless device of claim 27, wherein the information of one or more characteristics of the malicious source comprises information of a port number used by the malicious source.

30. The wireless device of claim 27, wherein the information of one or more characteristics of the malicious source comprises information of a protocol type used by the malicious source.

* * * * *